United States Patent [19]

Kondo et al.

[11] Patent Number: 4,553,018
[45] Date of Patent: Nov. 12, 1985

[54] SHORT CIRCUITING TRANSFER ARC WELDING MACHINE

[75] Inventors: Masatsune Kondo, Aichi; Youichiro Tabata; Shigeo Ueguri, both of Hyogo; Takaji Mizuno; Hirohisa Segawa, both of Aichi; Seigo Hiramoto, Hyogo, all of Japan

[73] Assignees: Mitsubishi Denki Kabushiki Kaisha; Toyota Jidosha Kabushiki Kaisha, both of Japan

[21] Appl. No.: 545,977

[22] Filed: Oct. 27, 1983

[51] Int. Cl.[4] .............................................. B23K 9/09
[52] U.S. Cl. ......................... 219/130.51; 219/130.33; 219/137 PS
[58] Field of Search ...................... 219/130.51, 130.21, 219/130.33, 137 PS

[56] References Cited

U.S. PATENT DOCUMENTS 4,000,374 12/1976 DeKeyser ...................... 219/130.33
4,125,759 11/1978 Kiyohara et al. ............. 219/137 PS
4,300,036 11/1981 Johansson ...................... 219/130.33

Primary Examiner—Clifford C. Shaw
Attorney, Agent, or Firm—Sughrue, Mion, Zinn, Macpeak, and Seas

[57] ABSTRACT

A short circuiting arc welding machine increases an arc current density by adding a pulsed current having upper and lower limits to a current flowing when an arc is produced, thereby increasing the depth of bead penetration into a workpiece, removing welding defects, and speeding up the welding operation. The welding machine is capable of alternately changing the direction of flow of a welding current at desired periods to produce arcs in straight, reverse and mixed polarities for achieving intermediate characteristics of arcs of straight and reverse polarities, with a resultant ability to adjust in a wide range a wire melting rate and the amount of heat applied to the workpiece.

20 Claims, 11 Drawing Figures

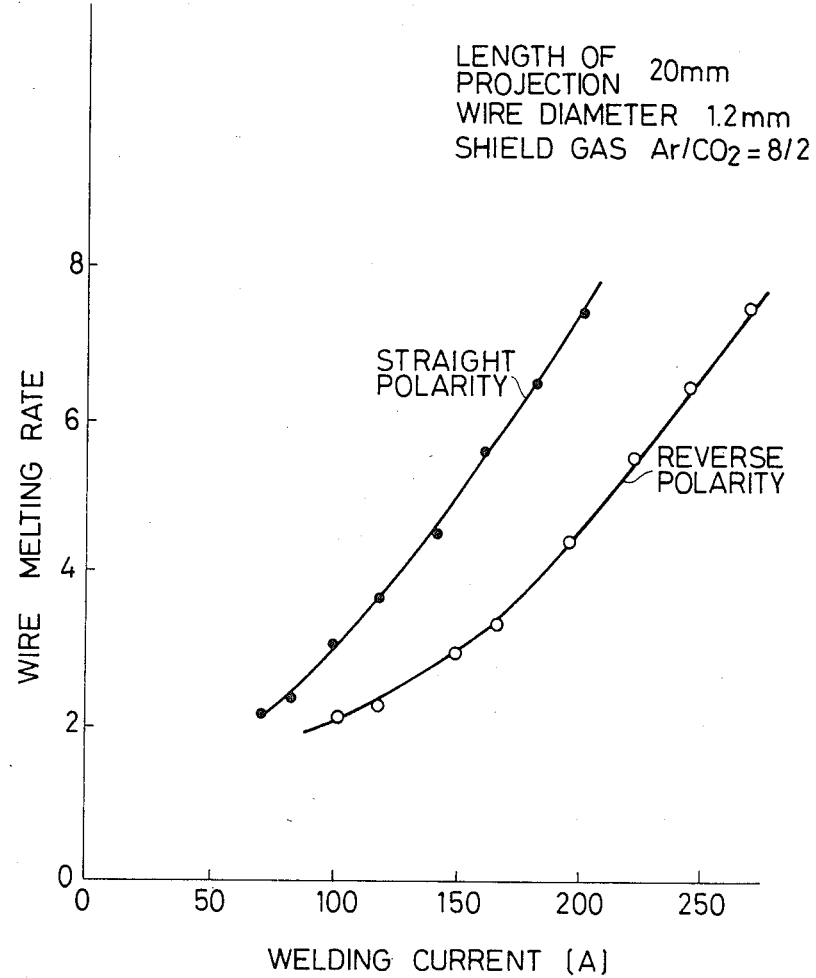

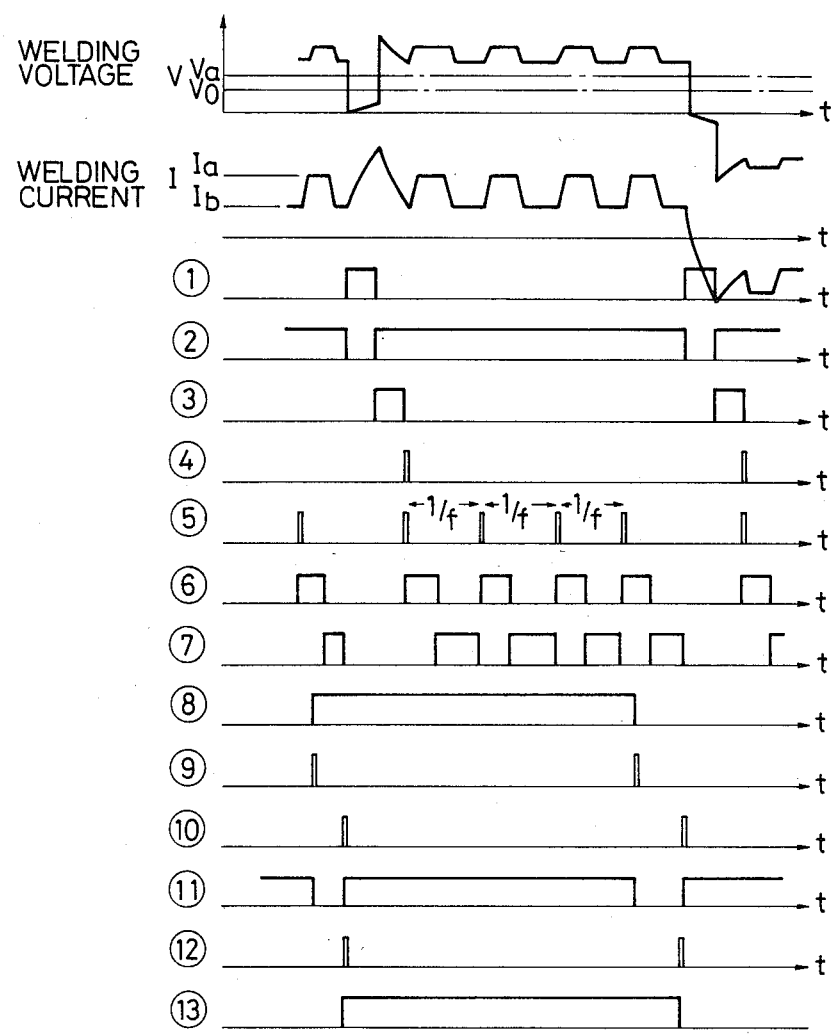

SHORT CIRCUITING TRANSFER ARC WELDING MACHINE

BACKGROUND OF THE INVENTION

The present invention relates to a short circuiting transfer arc welding machine, and more particularly to a short circuiting transfer arc welding machine capable of supplying a proper current dependent on the load condition between a wire electrode (hereinafter referred to as a "wire" and) a workpiece.

FIG. 1 of the accompanying drawings illustrates a conventional short circuiting arc welding machine. The short circuiting arc welding machine is composed of a DC power supply circuit 1 supplied with commercial three-phase AC power, a switching element 2 such as a transistor, a DC reactor 3, a diode 4 for limiting a surge voltage produced by the DC reactor 3 immediately after the switching element 2 is cut off, an auxiliary power supply 5 for supplying a direct current to maintain an arc, a wire supply reel 6 for supplying a wire 7, a motot 8 for feeding the wire 7, and a welding torch 9 for welding a workpiece 10. The arc welding machine also includes a switching control circuit 12 for generating command signals for opening and closing the switching element 2, a voltage detector 15 for detecting a voltage V between the wire 7 and the workpiece 10, a first decision circuit 16 for comparing the voltage V as detected by the voltage detector 15 and a reference voltage Vo and for issuing a signal for increasing a welding current to the switching control circuit 12 when $V \leq Vo$, and a second decision circuit 17 for comparing the voltage V as detected by the voltage detector 15 and a reference voltage Va and for energizing a timer 18 and issuing, upon elapse of an interval of time T, a signal to reduce the welding signal to the switching control circuit 12 when $V \geq Va$.

FIG. 2 (a) is a diagram showing the waveform of the voltage applied between the wire 7 and the workpiece 10, FIG. 2(b) is a diagram showing the waveform of the welding current, FIG. 2(c) is a view showing an arc condition, and FIG. 2(d) is a cross-sectional view of a weld bead.

The operation of the prior art welding machine will now be described. First, the DC power supply circuit 1 and the auxiliary power supply 5 are energized and the motor 8 is driven for feeding the wire 7 until its end and the workpiece 10 form a short circuit. The voltage V as detected by the voltage detector 15 is now smaller than the reference voltage Vo, and the first decision circuit 16 issues a signal to the switching control circuit 12 to increase the welding current. The switch control circuit 12 then closes the switching element 2. As shown in FIGS. 2(a) and 2(b), the welding current increases during a period A until the short circuit between the wire 7 and the workpiece 10 is eliminated and an arc is produced therebetween. When the arc is generated, the voltage detected by the voltage detector 15 is equal to an arc voltage. The output from the first decision circuit 16 is then cut off, and the second decision circuit 17 produces a signal to energize the timer 18. Upon elapse of the time delay T after the voltage V from the voltage detector 15 has exceeded the reference voltage Va, the switching control circuit 12 is responsive to a signal from the timer 18 to turn off the switching element 2. The welding current is now reduced through the DC reactor 3, the diode 4, the workpiece 10, and the wire 7, until finally current flows only from the auxiliary power supply 5. The foregoing cycle of short circuiting and arcing is repeated to melt the wire 7 and the workpiece 10 and transfer the molten material from the wire 7 to the workpiece 10, thereby forming a weld.

As shown in FIG. 2(b), during an arcing period B, the welding current varies relatively smoothly and the arc flame tends to spread as shown in FIG. 2(c). This results in a reduced arc current density on the surface of the workpiece, and a weld bead with small penetration into the workpiece as shown in FIG. 2(d). This problem manifests itself where the polarity (known as "straight polarity") of the arc is such that the wire 7 is rendered negative and the arc current density on the workpiece surface is lower. The weld cannot be sufficiently strong, and the speed of the welding operation cannot be increased due to a reduced amount of bead penetration into the workpiece.

SUMMARY OF THE INVENTION

With the foregoing prior difficulties in view, it is an object of the present invention to provide a short circuiting arc welding machine in which the arc current density is increased by adding a pulse current having upper and lower limits to a current flowing when an arc is produced, thereby increasing bead penetration into a workpiece, removing welding defects, and speeding up the welding operation.

Another object of the present invention is to provide a short circuiting arc welding machine capable of alternately changing the direction of flow of a welding current at desired periods to produce arcs in straight, reverse and mixed polarities for achieving intermediate characteristics of arc of straight and reverse polarities, with a resultant ability to adjust in a wide range a wire melting rate and the amount of heat applied to the workpiece.

Straight polarity (i.e., with the wire being negative) and reverse polarity (i.e., with the wire being positive) are shown in FIG. 3 of the accompanying drawings with respect to the wire melting rate and the welding current. Due primarily to the large thermal input to the cathode in arc welding, the wire welding rate with the straight polarity is about 1.5 times that with the reverse polarity for the same value of welding current.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a diagram showing the relationship between a wire melting rate and a welding current;

FIG. 6 is a timing chart illustrative of waveforms of signals in the arc welding machine shown in FIGS. 4 and 5;

DESCRIPTION OF THE PREFERRED EMBODIMENT

Figure 1:
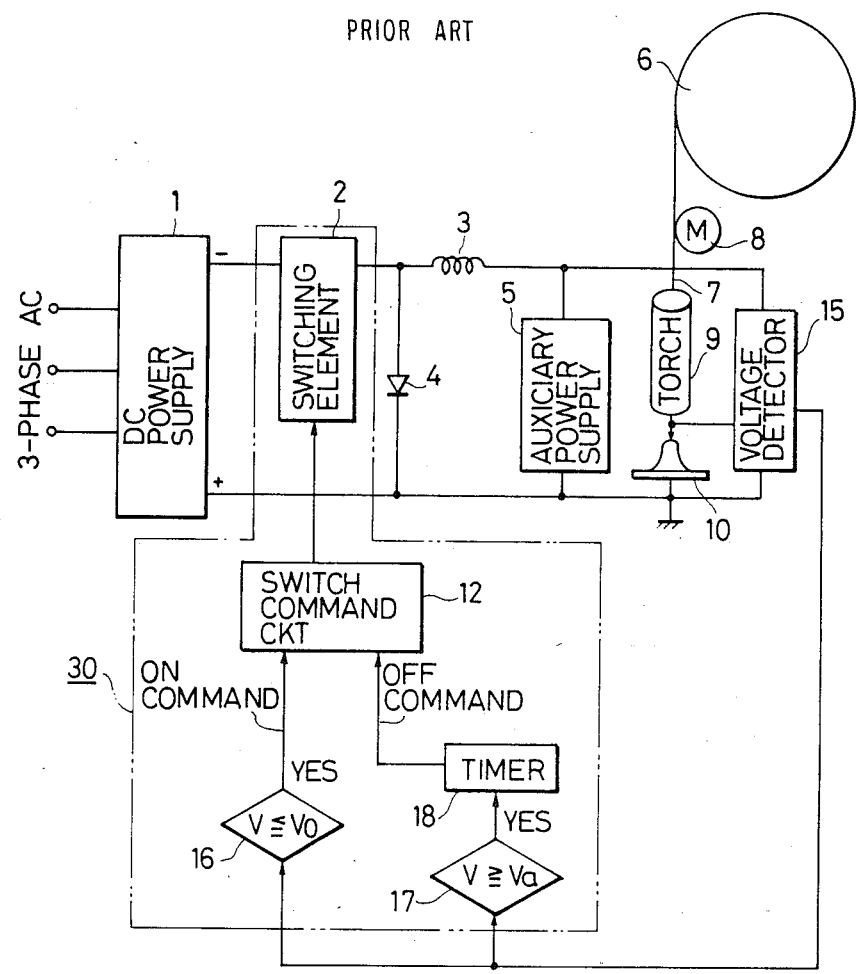
FIG. 1 is a block diagram of a conventional short circuiting arc welding machine.
Figure 2A:
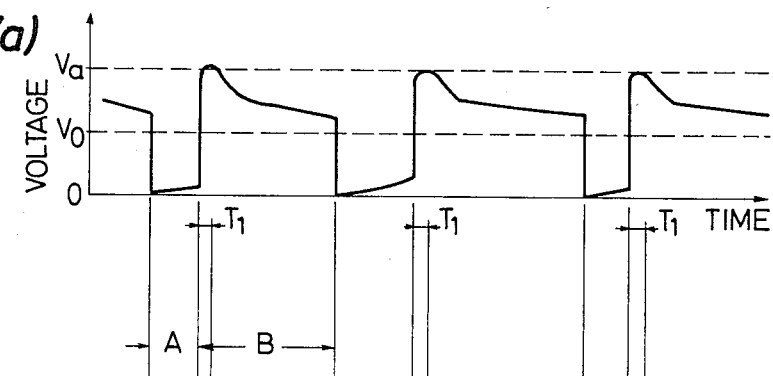
FIG. 2(a) is a diagram showing the waveform of a voltage applied between a wire and a workpiece in the conventional arc welding machine shown in FIG. 1.
Figure 2B:
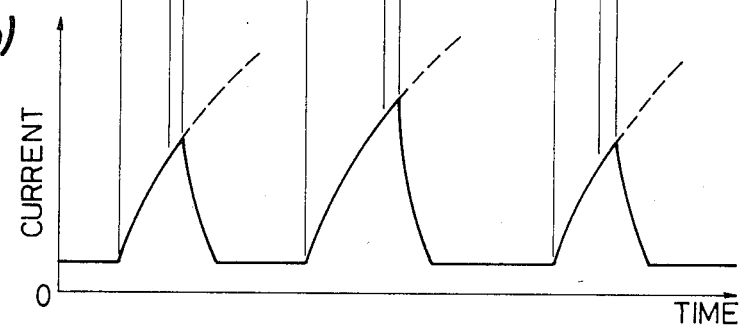
FIG. 2(b) is a diagram showing the waveform of a current.
Figure 2C:
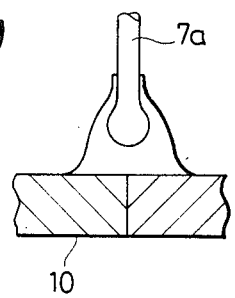
FIG. 2(c) is a view illustrative of an arc condition.
Figure 2D:
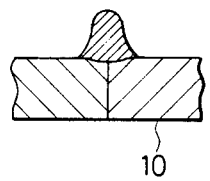
FIG. 2(d) is a cross-sectional view of a weld bead formed.

A short circuiting arc welding machine according to the present invention will be described with reference to FIG. 4. Identical or correponding parts are denoted by identical or corresponding reference characters in FIGS. 1 and 4. The short circuiting arc welding machine shown in FIG. 4 includes a second rectifier 50 for rectifying a detected current I from a current detector 11, a first rectifier 51 composed of a diode bridge, for example, for rectifying a detected voltage from a voltage detector 15, and a current comparator 40 for comparing the detected current I from the second rectifier 50 with a set current Ib and issuing a signal when the detected current I is smaller than the set current Ib. A pulse generator 35 starts issuing a pulse signal in response to an output from the second decision circuit 17 and a signal from the current comparator 40. Accordingly, the current comparator 40 serves as a circuit for commanding the starting of a pulse current.

A set current switching circuit 25 is responsive to signals from the first decision circuit 16, the second decision circuit 17, and the current comparator 40 for changing set currents and issuing a selected current. More specifically, when the workpiece 10 and the wire 7 form a short circuit, the set current switching circuit 25 is responsive to a signal from the first decision circuit 16 for issuing a short circuiting current. When there is an arcing condition between the workpiece 10 and the wire 7, the set current switching circuit 25 is responsive to a signal from the second decision circuit 17 for delivering an arcing current. When the detected current I is smaller then the set current Ib, the set current switching circuit 25 is responsive to a signal from the pulse generator 35 for issuing the arcing current plus a pulse current added thereto.

A current on-off command circuit 41 compares an output from the set current switching circuit 25 and the detected current I from the second rectifier 50 and issues a current on-off command. A polarity ratio setting circuit 80 serves to set ratio between a time interval in which to effect straight-polarity welding and a time interval in which to effect reverse-polarity welding in the welding process. Welding will be carried out in straight or reverse polarity for the time periods determined by the setting circuit 80. A polarity switching circuit 70 effects switching between straight-polarity welding and reverse-polarity welding. The polarity switching circuit 70 issues a signal in response to a signal from the first decision circuit 16 upon elapse of a time period set by the polarity ratio setting circuit 80, that is, when a short circuit is detected. A switch command circuit 12 is responsive to a signal of a polarity dependent on the output from the polarity switching circuit 70 and a current on-off command from the current on-off command circuit 41 for issuing a signal to control conduction of an inverter 2. The inverter 2 is responsive to a signal from the switch command circuit 12 for turning on and off the switching elements of the inverter 2 to control a current to be supplied to the wire 7 and the workpiece 10.

Figure 4:
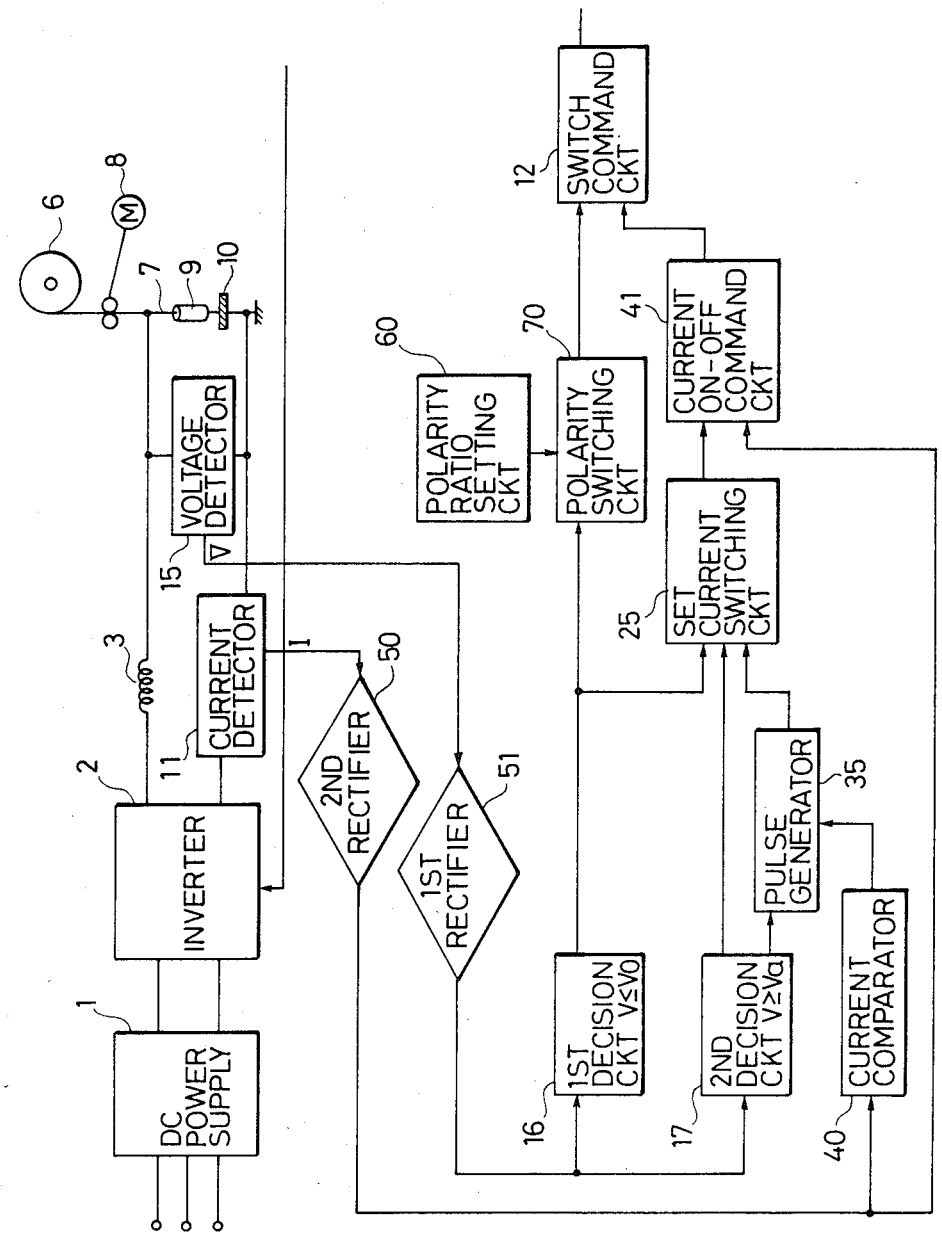
FIg. 4 is a block diagram of a short circuiting arc welding machine according to the present invention.
Figure 5:
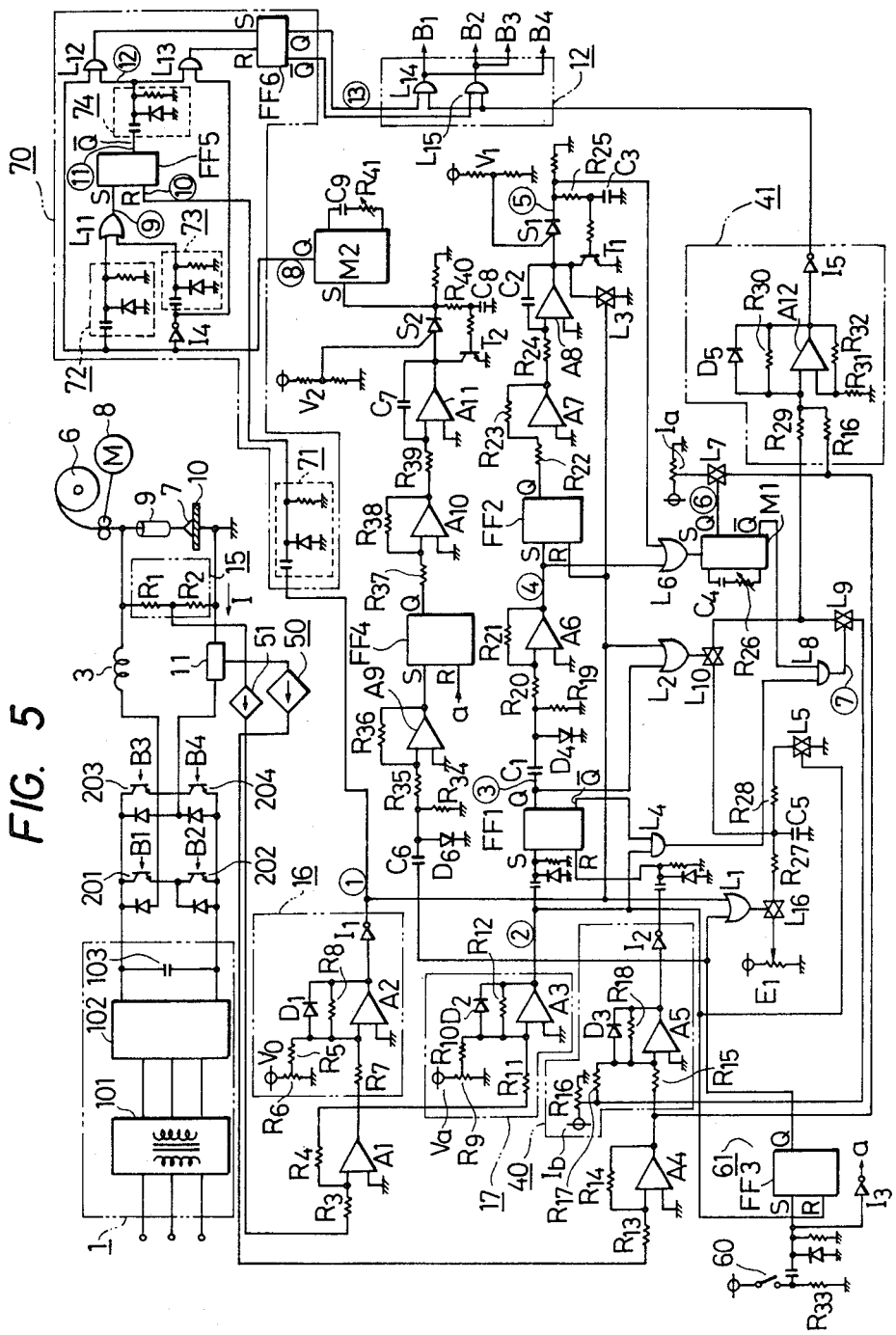
FIG. 5 is a detailed circuit diagram of the short circuiting arc welding machine shown in FIG. 4.

FIG. 5 shows one example of the circuit arrangement of FIG. 4 in greater detail. A DC power supply circuit 1 comprises a transformer 101, a rectifier diode bridge 102, and a surge absorbing capacitor 103. The inverter 2 is composed of a plurality of switching elements 201, 202, 203, 204 for turning on and off a welding current to control the waveform thereof, each switching element being shunted by a current feedback diode connected in anti-parallel. The voltage detector 15 has a pair of resistors R1, R2 connected in series with each other. The current detector 11 is connected between the inverter 2 and the voltage detector 15. The voltage detector 15 issues an output which is rectified by the first rectifier 51, inverted by resistors R3, R4 and an amplifier A1, and then applied to the first and second decision circuits 16, 17.

The first decision circuit 16 is composed of a power supply for generating a signal corresponding to the voltage Vo, resistors R5, R6, R7, R8, a diode D1, an amplifier A2, and an inverter I1. The second decision circuit 16 is composed of a power supply for generating a signal corresponding to the voltage Va, resistors R9, R10, R11, R12, a diode D2, and an amplifier A3. The first decision circuit 16 issues an output to OR gates L1, L2, the reset terminal of a flip-flop FF2, the gate of an analog switch L3, and the polarity switching circuit 70. The second decision circuit 17 delivers an output to the set terminal of a flip-flop FF1, an AND gate L4, the reset terminal of a flip-flop FF3, and the gate of an analog switch L5.

The output from the current detector 11 is rectified by the second rectifier or diode bridge 51 into a positive signal, which is inverted and amplified by resistors R13, R14 and an amplifier A4, and applied through a resistor R15 to an amplifier A5 and through a resistor R16' to an amplifier A12. The current comparator 40 comprises a power supply for issuing a voltage signal corresponding to the current Ib, and further comprises a resistor R15, resistors R16, R17, R18, a diode D3, an amplifier A5, and an inverter I2 for comparing the welding current I with the current Ib. An output from the current comparator 40 is fed to the reset terminal of the flip-flop FF1.

An output from a Q terminal of the flip-flop FF1 is differentiated by a capacitor C1, a diode D4, and a resistor R19, inverted by resistors R20, R21 and an amplifier A6, and applied to the set terminal of the flip-flop FF2. The output from the Q terminal of the flip-flop FF1 is also applied to the OR gate L2. An output from a $\overline{Q}$ terminal of the flip-flop FF1 is applied to the AND gate L4.

An output from a Q terminal of the flip-flop FF2 is inverted by resistors R22, R23 and an amplifier A7, and is then integrated by an integrator composed of a resistor R24, a capacitor C2, and an amplifier A8 into an integrated output signal having a gradient proportional to the value of R24×C2. The integrated output is applied to the anode of a thyristor S1. When the integrated output, or anode voltage, is equal to a gate voltage V1, the thyristor S1 is rendered conductive to produce a positive voltage at the cathode thereof. The cathode voltage charges a capacitor C3 through a resistor R25. As the voltage across the capacitor C3 gradually increases to the point where a transistor T1 is rendered conductive after about 100 s, the voltage of the amplifier A8 drops to zero. The cathode voltage for the thyristor S1 is in the form of a sawtooth wave having a frequency f measure from a falling edge of the output from the terminal Q of the flip-flop FF1, the frequency f being adjustable with the voltage V1.

The pulse generator 35 is composed of the above circuit arrangement including the flip-flop FF1 receptive of an input signal and the thyristor S1 for producing a pulses signal.

The output from the amplifier A6 and the cathode voltage from the thyristor S1 are applied to an OR gate L6 which issues an output to the set terminal of a monostable multivibrator M1. The monostable multivibrator M1 is responsive to the signal applied to the set terminal thereof for delivering from its terminal Q a positive pulse having a duration determined by a capacitor C4 and a resistor R26. The output from the terminal Q of the monostable multivibrator M1 is delivered to the gate of an analog switch L7. An output from the AND gate L4 and an output from the terminal $\bar{Q}$ of the monostable multivibrator M1 are applied to an AND gate L8, the output of which is fed to the gate of an analog switch L9.

An output from a power supply E1 charges a capacitor C5 through an analog switch L16 and a resistor R27. Any charged voltage across the capacitor C5 is discharged through a resistor R28 and an analog switch L5. Accordingly, the voltage across the capacitor C5 rises at a time constant of r27×C5 and falls at a time constant of R28×C5. A voltage signal corresponding to the current Ia is applied to the analog switch L7, andd a voltage signal corresponding to the current Ib is applied to an analog switch L9. Outputs from the analog switches L7, L9 and an analog switch L10 correspond to the set waveform of the welding current, and are fed through a resistor R29 to the amplifier A12.

The set current switching circuit 25 comprises the foregoing circuit arrangement supplied with a signal from the OR gates L1, L2, L6, the AND gate L4, and the analog switch L9 for issuing a signal to the current on-off command circuit 41.

The input of the amplifier A12 is supplied through the resistor R16' with the output from the amplifier A4 corresponding to the welding current I. The current on-off command circuit 41 is composed of the resistors R16', R29, R30, R31, R32, the diode D5, the amplifier A12, and an inverter It. The output from the current on-off command circuit 41, delivered through a diode D5 and resistors R30, R31, R32, becomes low in logic level when the welding current is greater than the setting and high in logic level when the welding current is smaller than the setting.

When a welding operation is to be started, a welding switch 60 is closed to apply the voltage across a resistor R33 to a differentiating circuit for delivering a trigger signal of a high logic level to the set terminal of the flip-flop FF3. The power supply, the welding switch 60, the resistor R33, the differentiating circuit, and the flip-flop FF3 jointly serve as a welding starting circuit 61.

An output from the terminal Q of the flip-flop FF3 is differentiated by a capacitor C6, a diode D6, and a resistor R34, inverted by an inverter composed of resistors R35, R36, and an amplifier A9, and applied to the set terminal of a flip-flop FF4. The voltage across the resistor R33 is inverted by an inverter I3 and is then applied to the reset terminal of the flip-flop FF4. An output from the terminal Q of the flip-flop FF4 is inverted by an inverter comprising resistors R37, R38 and an amplifier A10, and then integrated by an integrator constructed of a resistor R39, a capacitor C7, and an amplifier A11. When an output voltage from the amplifier A11 is increased up to a level equal to a gate voltage V2 of a thyristor S2, the thyristor S2 is rendered conductive to produce a voltage at the cathode of the thyristor S2. The cathode voltage charges a capacitor C8 through a resistor R40 to trigger a transistor T2, thereby lowering to zero the output voltage from the amplifier A11. Then, the thyristor S2 is cut off, and so is the transistor T2, whereupon the output voltage from the amplifier A11 increases again. As a result, the cathode voltage of the thyristor S2 becomes a pulsed voltage having a period determined by the voltage V2, and is applied to the set terminal of a monostable multivibrator M2. In response to the input applied to its set terminal, the monostable multivibrator M2 issues through its output terminal Q a pulse having a pulse duration determined by a capacitor C9 and a resistor R41. The output from the terminal Q of the monostable multivibrator M2 goes high in logic level when the welding arc has the reverse polarity.

The polarity ratio setting circuit 80 is composed of a circuit arrangement including a differentiating circuit comprising the capacitor C6, the diode D6, and the resistor R34, and the circuit for issuing a signal to the polarity switching circuit 70.

The polarity switching circuit 70, for changing polarities when a short circuit is formed between the wire 7 and the workpiece 10, comprises differentiating circuits 71, 72, 73, 74, an inverter T4, an OR gate L11, AND gates L12, L13, and flip-flops FF5 and FF6. An output from a terminal Q of the flip-flops FF6 goes high when the welding arc is of reverse polarity, and an output from a terminal $\bar{Q}$ thereof goes high when the welding arc is of straight polarity. The outputs from the flip-flop FF6 are applied to the switch command circuit 12 which is constructed of AND gates L14, L15. Outputs from the switch command circuit 12 are delivered to base terminals B1, B2, B3, B4 of the switching elements 201–204, respectively, in the inverter 2.

The operation of the short circuiting arc welding machine thus constructed will be described with reference to FIG. 6, which is a timing chart showing signal waveforms in the circuit arrangment of FIGS. 4 and 5. The waveforms (1) through (13) shown in FIG. 6 are indicative of signals produced respectively in points (1) through (13) in FIG. 5.

For starting a welding operation, the welding switch 60 is turned on and the motor 8 is energized to bring the wire 7 into contact with the workpiece 10 to thereby form a short circuit therebetween. The output from the amplifier A1 becomes a negative voltage having a small absolute value, so that the output from the first decision circuit 16 goes high, and hence the analog switches L10, L16 are rendered conductive to allow the voltage across the capacitor C5 (which is charged up to a level equal to the voltage E1 when the welding operation is started) to be applied to the amplifier A12 through the resistor R29. Therefore, the welding current is abruptly increased to produce an arc between the wire 7 and the workpiece 10.

When the arc is formed, the output from the amplifier A1 becomes a negative voltage having a large absolute value, whereupon the voltage of the output (1) from the first decision circuit 16 goes low, and the voltage of the output (2) from the second decision circuit 17 goes high to set the flip-flop FF1. At the same time, the analog switch L16 is cut off, and the analog switch L5 is rendered conductive, so that the voltage across the capacitor C5 becomes progressively smaller.

Since the flip-flop FF2 is set at the beginning of the arcing interval, the Q output (3) of the flip-flop FF1 will be at high level during the arcing interval as long as I≧Ib.

The arc current is detected by the current detector 11 and compared with the current Ib by the current comparator 40. As long as I≧Ib after the arc has been generated, the decreasing voltage across the capacitor C5 is applied through the resistor R29 to the amplifier A12. When the arc current I<Ib, the output of the inverter I2 goes high, to reset the flip-flop FF1, a trigger signal is applied to the set terminal (4) of the flip-flop FF2, and thereafter a pulsed voltage having a frequency determined by the voltage V1 is generated at the anode (5) of the thyristor S1. In synchronism with this pulsed voltage, a pulse voltage having a duration determined by the capacitor C4 and the resistor R26 is produced at the terminal Q (6) of the multivibrator M1, during which time the analog switch L7 is rendered conductive to allow a voltage corresponding to Ia to be applied through the resistor R29 to the amplifier A12. As long as pulses are generated at a fixed frequency from the anode (5) of the thyristor S1 and the output (6) from the terminal Q of the multivibrator M1 is at high level, the output (7) from the AND gate L8 will be at a high level to render the analog switch L9 conductive, thereby permitting the voltage corresponding to Ib to be applied through the resistor R29 to the amplifier A12. As a consequence, the output from the current on-off command circuit 41 goes high when the welding current is smaller than a reference current, and goes low when the welding current is larger than the reference current.

The reference current values are as defined in the following table:

|  |  | Reference current |
|---|---|---|
| When short-circuited |  | Current corresponding to voltage across C5 |
| When arc is generated | When voltage (3) is high | Current corresponding to voltage across C5 |
|  | When voltage (6) is high | Ia |
|  | When voltage (7) is high | Ib |

The manner in which polarities are changed will now be described. When the direction of flow of a current is to be varied while an arc is being produced, the arc is cut off the moment the current becomes zero, and remains cut off until the wire 7 subsequently contacts the workpiece 10 to form a short circuit therebetween. Therefore, it is preferred that polarities be changed while there is a short circuit between the wire 7 and the workpiece 10.

The terminal Q (8) of the multivibrator M2 produces a pulse starting when a short circuit is generated between the wire 7 and the workpiece 10 immediately after the welding operation has begun and having a pulse duration determined by the capacitor C9 and the resistor R41. The high level of this pulse substantially represents the period of reverse polarity, while the low level thereof substantially represents the period of straight polarity. The output (8) from the terminal Q of the multivibrator M2 is applied to the polarity switching circuit 70, which produces a signal to change polarities at the time of a first short circuit immediately after the output (8) from the terminal Q has changed from high level to low level or vice versa.

The polarity switching circuit 70 operates as follows: The output (9) from the OR gate L11 is in the form of pulses produced at rising and falling edges of the voltage (8) from the terminal Q of the multivibrator M2, and the output (10) from the differentiating circuit 71 is in the form of pulses produced at rising edges of the output (1) from the first decision circuit 16. Therefore, the output from the terminal $\overline{Q}$ of the flip-flop FF5 varies as shown by waveform (11) in FIG. 6, and the output (12) from the differentiating circuit 74 is in the form of pulses generated at rising edges of the output (11) from the terminal $\overline{Q}$ of the flip-flop FF5. Accordingly, the output from the terminal Q of the flip-flop FF6 is generated as shown by waveform (13) in FIG. 6, thus producing a signal for generating a reverse-polarity arc during a high level thereof. The output terminals B1, B4 of the switch command circuit 12 produce trigger signal when both of the output (13) of the terminal Q of the flip-flop FF6 and the output from the current on-off command circuit 41 are high, rendering the switching elements 201, 204 conductive to generate a reverse-polarity arc. Likewise, when the output (13) is low and the output from the current on-off command circuit 41 is high, the output terminals B2, B3 produce trigger signals for rendering conductive the switching elements 202, 203 in order to generate a straight-polarity arc.

The welding current I rises at a time constant R27×C5 while there is a short circuit between the wire 7 and the workpiece 10, and falls at a time constant R28×C5 while there is an arc therebetween. After the welding current I has reached the current setting Ib, the welding current cycles at a predetermined frequency between the upper limit Ia and the lower limit Ib, while simultaneously inverting the arc polarity cyclically at a predetermined period. FIG. 6 illustrates the welding current and voltage as positive while the arc is of reverse polarity. The voltage waveform pulsates during the arcing period in response to the arc current pulsation since the voltage is proportional to the arc current.

Figure 7A:
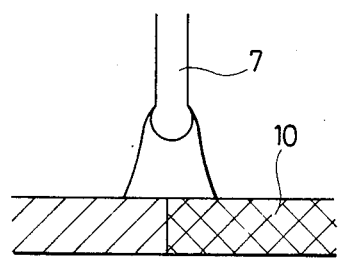
FIG. 7(a) is a view showing an arc condition in the arc welding machine of the present invention.
Figure 7B:
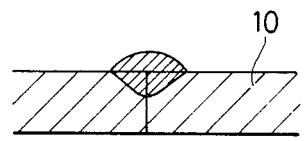
FIG. 7(b) is a cross-sectional view of a weld bead formed by the arc welding machine of the present invention.

Accordingly, by adding a pulse current to the arc current during the arcing period, the peak current Ia can be increased without having to vary the average value of the arc current. In general, the larger the current, the greater the arc current density. The arc force acting on the workpiece by the arc is proportional to $I^2$, so that increased current leads to increased bead penetration into the workpiece. As a result, the arc is constricted as shown in FIG. 7(a) and the bead penetration is deep as shown in FIG. 7(b). The current Ia can be established on the basis of a required depth of bead penetration, and the current Ib can be established so that no arc interruption will occur (about 30 to 50 A). A required depth of bead penetration can therefore be achieved reliably without any arc interruption. The currents Ia, Ib may be of different values dependent on the polarity. The polarities may be alternated at a desired ratio to thereby vary both the amount of heat applied to the workpiece and the thickness of a weld reinforcement over a wider range than is possible with a single arc polarity. This can provide stable welding conditions for a wide variety of workpiece shapes and thicknesses. Since the arc current density increases in general as the frequency of an added pulse waveform goes higher, the depth of bead penetration can be controlled by changing the pulse waveform frequency.

Although a certain preferred embodiment has been shown and described, it should be understood that many changes and modifications may be made therein without departing from the scope of the appended claims.

We claim:

1. A short circuiting arc welding machine comprising:
   (a) a wire feed motor for feeding a wire electrode toward a workpiece;
   (b) a DC power supply circuit for supplying a welding current between the wire electrode and the workpiece;
   (c) an inverter for controlling said welding current;
   (d) a voltage detector for detecting a voltage between the wire electrode and the workpiece;
   (e) a current detector for detecting the welding current; and
   (f) a current control device for controlling said inverter in response to detected values from said voltage detector and said current detector, said current control device comprising:
      (1) a first decision circuit for issuing a signal when said detected voltage is smaller than a first reference voltage;
      (2) a second decision circuit for issuing a signal when said detected voltage is larger than a second reference voltage which is higher than said first reference voltage;
      (3) a current comparator for issuing a signal when said detected current is smaller than a predetermined current;
      (4) a pulse generator for issuing a pulse signal in response to the outputs from said second decision circuit and said current comparator;
      (5) a set current switching circuit for selecting and issuing one of a plurality of set current values in response to the outputs from said first decision circuit, said second decision circuit, and said pulse generator;
      (6) a current on-off command circuit for issuing a current on-off command through comparison between the output from said set current switching circuit and the detected current; and
      (7) a switch command circuit responsive to the on-off command from said current on-off command circuit for issuing a signal to control conduction of said inverter.

2. A short circuiting arc welding machine according to claim 1, wherein said first reference voltage is a voltage which occurs immediately after a short circuit between the wire electrode and the workpiece.

3. A short circuiting arc welding machine according to claim 2, wherein said second reference voltage is a voltage corresponding to a voltage for regenerating an arc between the wire electrode and the workpiece.

4. A short circuiting arc welding machine according to claim 1, wherein said current control device further comprises polarity switching means for switching the polarity of said welding current, and a polarity ratio setting circuit for setting time intervals for first and second opposite polarities of said welding current.

5. A short circuiting arc welding machine according to claim 4, wherein said polarity ratio setting circuit generates periodic transition signals at the end of each time interval of first or second welding current polarity, said current control device further comprising a polarity switching circuit for generating a polarity change signal upon reception of an output from said first decision circuit after generation of a periodic transition signal by said polarity ratio setting circuit, said switch command circuit being responsive also to an output of said polarity switching circuit for controlling said inverter to provide said welding current with a polarity based on the output of said polarity switching circuit.

6. A short circuiting arc welding machine according to claim 1, wherein said set current switching circuit includes: means responsive to the output from said first decision circuit for issuing a short circuit current, means responsive to the output from said second decision circuit for issuing an arc current, and means responsive to the output from said pulse generator for issuing the arc current with a pulsed current added thereto.

7. A short circuiting arc welding machine according to claim 6, wherein said current comparator includes means for issuing a signal for starting the addition of the pulsed current to the arc current.

8. A short circuiting arc welding machine according to claim 1, wherein said DC power supply circuit comprises a transformer for receiving a signal from a three-phase AC power supply, a rectifier diode bridge for rectifying an output from said transformer, and a surge-absorbing capacitor connected to said rectifier diode bridge.

9. A short circuiting arc welding machine according to claim 8, wherein said inverter comprises a plurality of transistors selectively conductive in response to said signal from said switch command circuit.

10. A short circuiting arc welding machine according to claim 9, wherein each of said transistors is shunted by a current feedback diode connected in anti-parallel.

11. A short circuiting arc welding machine according to claim 9, including a DC reactor connected between said inverter and the wire electrode and workpiece.

12. A short circuiting arc welding machine according to claim 11, including a welding starting circuit for energizing said polarity switching circuit and said set current switching circuit and issuing a signal for resetting said pulse generator.

13. A short circuiting arc welding machine according to claim 12, wherein said welding starting circuit comprises a welding switch, a differentiating circuit connected thereto, and a flip-flop coupled to said differentiating circuit.

14. A short circuiting arc welding machine according to claim 13, wherein said wire feed motor is driven in response to actuation of said welding switch.

15. A short circuiting arc welding machine of the type having a workpiece, an electrode, current supply means for supplying welding current between said electrode and workpiece in response to control signals, voltage monitoring means for monitoring the voltage between said electrode and workpiece and control means responsive to at least the monitored voltage for controlling said current supply means to supply a first current between said electrode and workpiece during a short circuit interval when said electrode contacts said workpiece and a second current between said electrode and workpiece during an arc interval when an arc is formed between said electrode and workpiece, said second current being lower than said first current, said second current comprising a base current level $I_b$ with at least one current pulse superimposed on said base current level of current during said arc interval, wherein said current control means comprises current detection means for monitoring said welding current, current setting means for setting a desired current reference level, comparison means for comparing said detected current and desired current reference level and providing an output signal when said detected current falls below said desired current reference level, and switch means responsive to said output from said comparison means for activating said current supply means, said current setting means including means for setting a first reference level during a short circuit interval, a second reference level lower than said first reference level during said current pulse, and a third reference level lower than said second reference level at the remaining times during said arc interval.

16. A short circuiting arc welding machine according to claim 15, wherein said current supply means comprises first for providing a current of said base level at all times and second means controlled by said control means for providing additional current to be superimposed with said based current level during said short circuit interval, said control means controlling said second means during said arc interval to provide a series of additional current pulses between said electrode and workpiece.

17. A short circuiting arc welding machine according to claim 15, wherein said control means controls said current supply means to provide a current of at least said level base at substantially all times while providing additional current during said short circuit interval, said control means further controlling said current supply means to superimpose a series of current pulses on said base current level during said arc interval.

18. A short circuiting arc welding machine of the type having a workpiece, an electrode, current supply means for supplying welding current between said electrode and workpiece in response to control signals, said current supply means including polarity means for periodically switching the polarity of said welding current, voltage monitoring means for monitoring the voltage between said electrode and workpiece and control means responsive to at least the monitored voltage for controlling said current supply means to supply a first current between said electrode and workpiece during a short circuit interval when said electrode contacts said workpiece and a second current between said electrode and workpiece during an arc interval when an arc is formed between said electrode and workpiece, said second current being lower than said first current, said second current comprising a base current level $I_b$ with at least one current pulse superimposed on said base current level of current during said arc interval.

19. A short circuiting arc welding machine of the type having a workpiece, an electrode, current supply means for supplying welding current between said electrode and workpiece in response to control signals, voltage monitoring means for monitoring the voltage between said electrode and workpiece and control means responsive to at least the monitored voltage for controlling said current supply means to supply a first current between said electrode and workpiece during a short circuit interval when said electrode contacts said workpiece and a second current between said electrode and workpiece during an arc interval when an arc is formed between said electrode and workpiece, said second current being lower than said first current, said second current comprising a base current level $I_b$ with at least one current pulse superimposed on said base current level of current during said arc interval, said control means including polarity switching means for switching the polarity of current supplied from said current supply means, and ratio means coupled to said polarity switching means for setting the relative durations of first and second polarity welding currents.

20. A short circuiting arc welding machine according to claim 19, wherein said ratio means includes means for providing periodic transition signals indicating that a change in polarity is due, and said control means includes means responsive to said monitored voltage and said periodic transition signals for providing a polarity changing signal at the commencement of a first short circuit interval following a transition signal, said current supply means changing the polarity of said welding current in response to said polarity changing signal.

* * * * *